(12) United States Patent
Roybal et al.

(10) Patent No.: US 7,652,572 B2
(45) Date of Patent: Jan. 26, 2010

(54) METHODS, SYSTEMS AND DEVICES FOR DETECTING AND LOCATING FERROMAGNETIC OBJECTS

(75) Inventors: Lyle Gene Roybal, Idaho Falls, ID (US); Dale Kent Kotter, Shelley, ID (US); David Thomas Rohrbaugh, Idaho Falls, ID (US); David Frazer Spencer, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 275 days.

(21) Appl. No.: 11/539,678

(22) Filed: Oct. 9, 2006

(65) Prior Publication Data

US 2008/0084301 A1 Apr. 10, 2008

(51) Int. Cl.
*G08B 13/24* (2006.01)
(52) U.S. Cl. .................. 340/551; 324/260; 702/189
(58) Field of Classification Search .................. 340/551; 324/260; 702/127, 189
See application file for complete search history.

(56) References Cited

U.S. PATENT DOCUMENTS

| 3,971,983 | A | 7/1976 | Jaquet |
|---|---|---|---|
| 5,592,170 | A | 1/1997 | Price et al. |
| 6,150,810 | A | 11/2000 | Roybal |
| 6,952,163 | B2 | 10/2005 | Huey et al. |
| 7,013,245 | B2 | 3/2006 | Kotter et al. |
| 2004/0222790 | A1 | 11/2004 | Karmi et al. |
| 2005/0182590 | A1* | 8/2005 | Kotter et al. ................ 702/127 |

* cited by examiner

*Primary Examiner*—Thomas J Mullen
(74) *Attorney, Agent, or Firm*—TraskBritt

(57) ABSTRACT

Methods for detecting and locating ferromagnetic objects in a security screening system. One method includes a step of acquiring magnetic data that includes magnetic field gradients detected during a period of time. Another step includes representing the magnetic data as a function of the period of time. Another step includes converting the magnetic data to being represented as a function of frequency. Another method includes a step of sensing a magnetic field for a period of time. Another step includes detecting a gradient within the magnetic field during the period of time. Another step includes identifying a peak value of the gradient detected during the period of time. Another step includes identifying a portion of time within the period of time that represents when the peak value occurs. Another step includes configuring the portion of time over the period of time to represent a ratio.

20 Claims, 13 Drawing Sheets

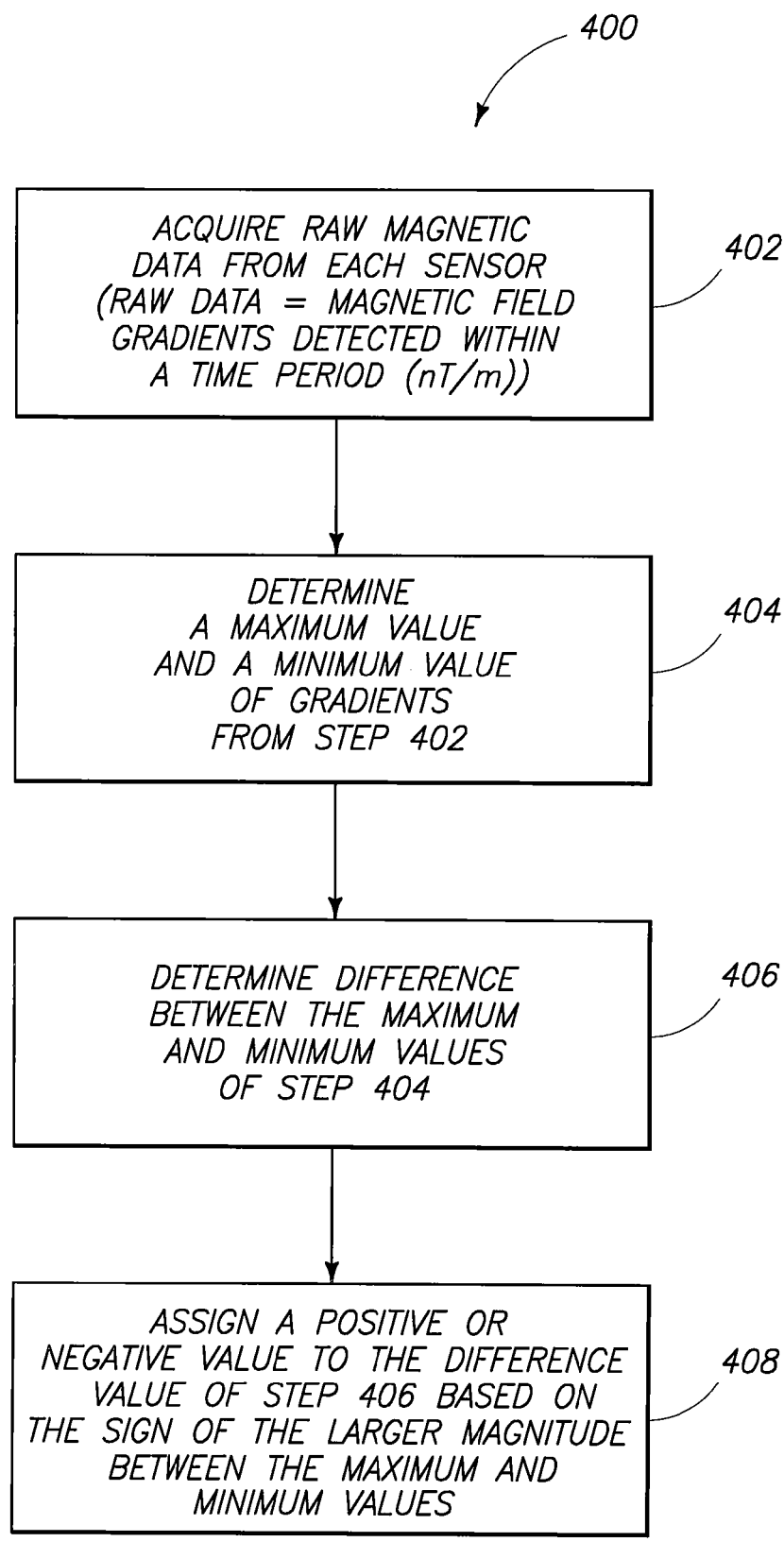

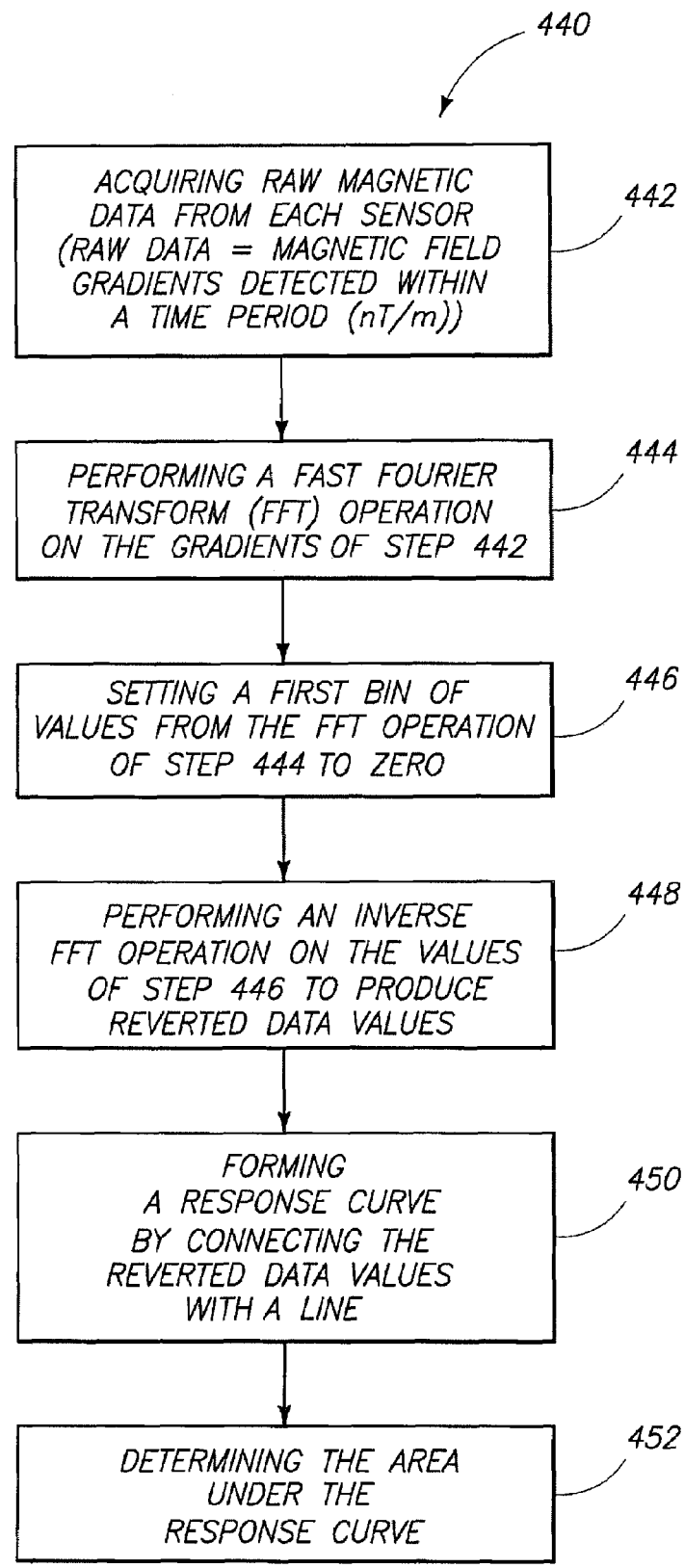

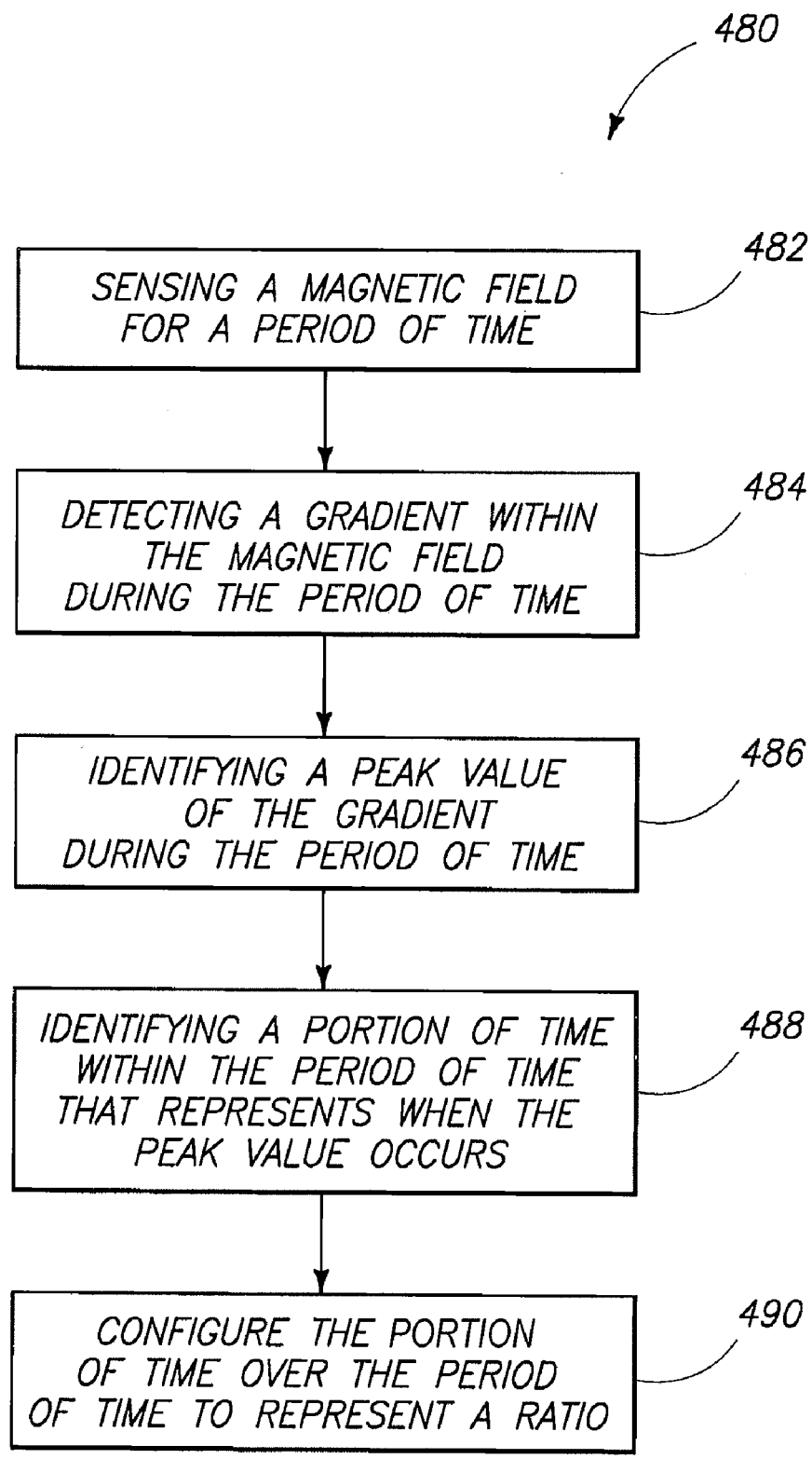

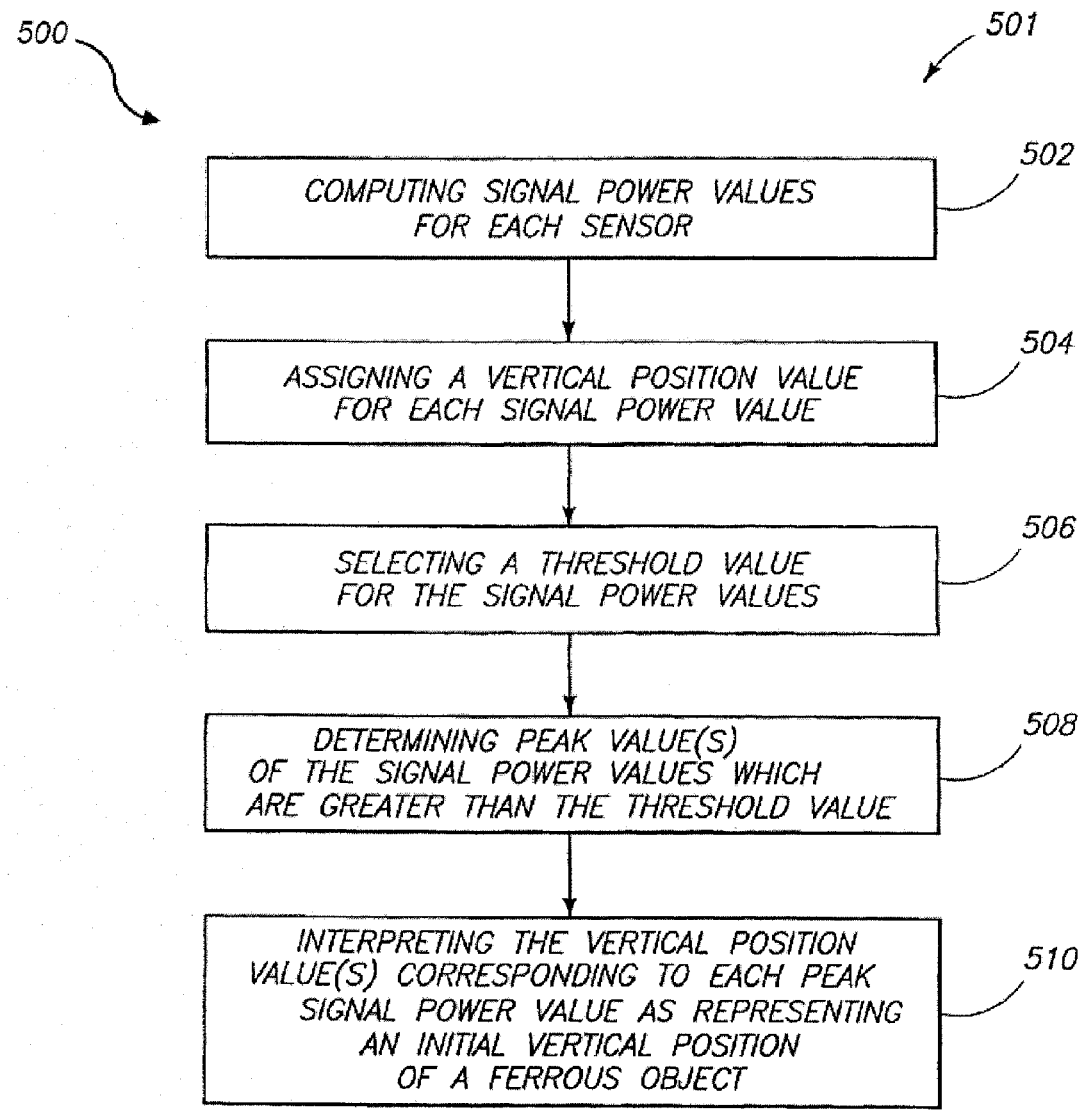

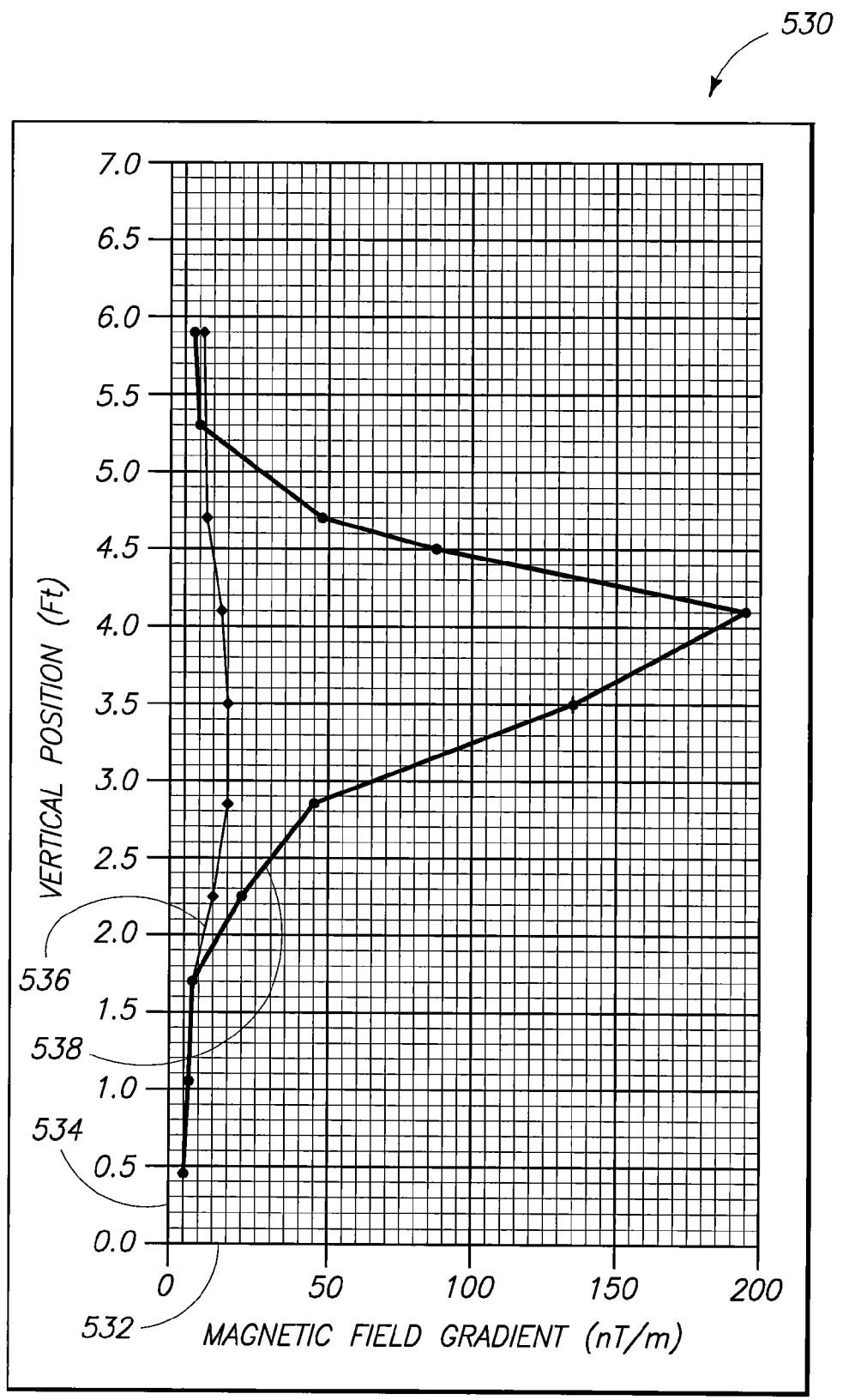

METHODS, SYSTEMS AND DEVICES FOR DETECTING AND LOCATING FERROMAGNETIC OBJECTS

GOVERNMENT RIGHTS

This invention was made with Government support under Contract DE-AC07-05-ID14517 awarded by the U.S. Department of Energy. The Government has certain rights in the invention.

TECHNICAL FIELD

The invention relates to methods and systems for detecting and locating threatening objects passing through a security screening system.

BACKGROUND OF THE INVENTION

The goal of detecting and locating threatening objects or items such as weapons has increased in importance as society becomes more violent. In response to this goal, security screening systems have become more prevalent and are being used in facilities and places where the need for screening was previously not considered necessary. To increase safety while keeping public inconvenience at a minimum, the focus of the security screening industry is to increase the accuracy of distinguishing between threatening and non-threatening objects while maintaining a high throughput.

Exemplary security screening systems (also referred to as "system(s)") are configured to rely on passive magnetic sensors or magnetometers to detect threatening objects. Such configurations of security screening systems depend on the unvarying and uniformity of the Earth's magnetic field to operate effectively. That is, passive magnetic sensors (also referred to as "sensor(s)") define a sensing region that extends into a portal passageway of the systems for detecting disturbances or variances in the uniformity of the magnetic field of the Earth. The variances in the magnetic field are called gradients. Exemplary weapons and/or threatening objects are routinely formed from ferrous or ferromagnetic material (iron). As ferrous or ferromagnetic material passes through a portal passageway, the Earth's magnetic field is disturbed or varied and is registered by the passive sensors. That is, the sensors detect this change or variance in the Earth's magnetic field as a gradient and output a response that is configured as a voltage signal. The security screening system interprets the gradient (voltage signal) as the detection of a ferrous object. In this manner, the security screening system indicates the presence of a potential weapon(s) within the portal passageway of the system.

However, the Earth's magnetic field varies slowly, and randomly, over a period of time that interrupts the operation of security screening systems based on passive sensor configurations. For example, the periodic rising and setting of the Sun causes diurnal variations to the Earth's magnetic field. Additionally, unpredictable solar flares and magnetic storms produced by the Sun randomly impact and vary the uniformity of the Earth's magnetic field. These influences are referred to as "far-field disturbances." Furthermore, "local disturbances" can influence and vary the uniformity of the Earth's magnetic field. Exemplary local disturbances include man-made objects such as wheelchairs and cars, and even larger ferromagnetic objects such as airport subways.

Security screening systems are designed to compensate for these far-field and local disturbances. However, baseline responses produced by the sensors of the systems tend to wander over a period of time as a result of these far-field and local disturbances. Additionally, electronic noise and instability inherent in the sensors combine with the far-field and local disturbances to compound the detrimental effects on operational capabilities of security screening systems.

Accordingly, there is a need to provide data analysis methods and detection/location methods for security screening systems to compensate for far-field disturbances, local disturbances, electronic noise, and instability inherent in the sensors. Moreover, there is a need to improve the signal-to-noise ratio of the magnetic sensors with data analysis methods and detection/location methods that compensate for DC drift and single-point response spikes, which are induced or outputted by magnetic sensors of security screening systems.

SUMMARY OF THE INVENTION

Some aspects of the invention provide methods for detecting and locating ferromagnetic objects in a security screening system. One exemplary method comprises a step of acquiring magnetic data that comprises magnetic field gradients detected during a period of time. Another step comprises representing the magnetic data as a function of the period of time. Another step comprises converting the magnetic data to being represented as a function of frequency.

Another aspect of the invention comprises another exemplary method for detecting and locating ferromagnetic objects. The exemplary method comprises a step of sensing a magnetic field for a period of time. Another step comprises detecting a gradient within the magnetic field during the period of time. Another step comprises identifying a peak value of the gradient detected during the period of time. Another step comprises identifying a portion of time within the period of time that represents when the peak value occurs. Another step comprises configuring the portion of time over the period of time to represent a ratio.

Another aspect of the invention comprises an exemplary security screening system. The system includes a portal structure that comprises a pair of opposite columns extending vertically and defining a passageway. The system includes an array of magnetic sensors that are arranged in each one of the opposite columns and configured to output magnetic data. Each magnetic sensor comprises a vertical position relative to ground level and is aligned with a corresponding magnetic sensor at substantially the same vertical position in the opposite column. The system includes a processor that is coupled to each magnetic sensor and configured to handle magnetic data represented in a time domain and a frequency domain.

BRIEF DESCRIPTION OF THE DRAWINGS

The drawings illustrate what is currently considered to be the best mode for carrying out the invention.

FIG. 4 is a graphical representation of magnetic data obtained from any one of the exemplary magnetic sensors according to one of various embodiments of the security screening system of FIG. 1, wherein no ferrous objects exist in the portal passageway.

FIG. 5 is an exemplary data analysis method according to one of various embodiments of the present invention.

FIG. 6 is an exemplary data analysis method according to one of various embodiments of the present invention.

FIG. 8 is an exemplary data analysis method according to one of various embodiments of the present invention.

FIG. 9 is a graphical representation of magnetic data obtained from the exemplary magnetic sensors of the security screening system of FIG. 1, illustrating the inventive data analysis method of FIG. 8.

DETAILED DESCRIPTION

This disclosure of the invention is submitted in furtherance of the constitutional purposes of the U.S. Patent Laws "to promote the progress of science and useful arts" (Article 1, Section 8).

Figure 1:
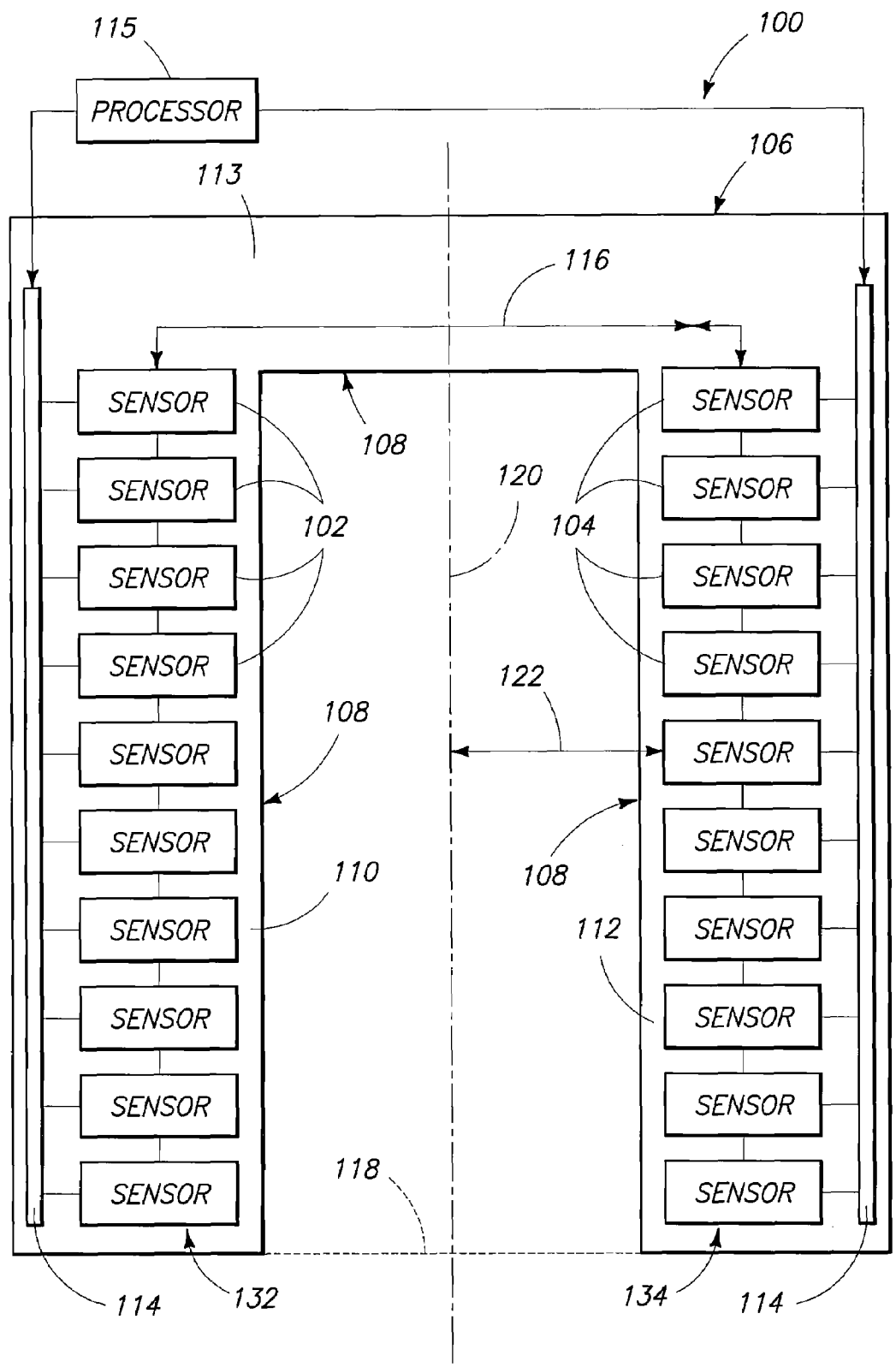
FIG. 1 is a front elevational view of an exemplary portal passageway of an exemplary security screening system according to one of various embodiments of the invention.

Referring to FIG. 1, an exemplary portal passageway for an exemplary security screening system 100 (hereinafter also referred to as "system 100") is described. The security screening system 100 comprises an exemplary portal structure or frame 106 having opposite vertical portions (or columns) 110 and 112 extending upward from a ground or floor level 118, as shown by dashed lines. Vertical portion 110 of the exemplary portal frame 106 houses an array 132 of magnetic sensors 102 oriented vertically (only four magnetic sensors 102 are referenced with a number). Vertical portion 112 of the exemplary portal frame 106 houses an array 134 of magnetic sensors 104 oriented vertically (only four magnetic sensors 104 are referenced with a number). In one of various embodiments of the invention, each array 132 and 134 comprises ten magnetic sensors 102 and 104, respectively. However, for other embodiments of the invention, each array comprises less than ten magnetic sensors or more than ten magnetic sensors. Additionally, in one of various embodiments of the invention, each array 132 and 134 comprises the same number of magnetic sensors, and in other embodiments, each array 132 and 134 comprises different numbers of magnetic sensors relative to each other.

Still referring to FIG. 1, each magnetic sensor 102 of array 132 is positioned a vertical distance or height relative the ground level 118 and is aligned with at least one corresponding magnetic sensor 104 of array 134, which is located at the same vertical distance or position relative the ground level 118. For example, each magnetic sensor 102 of array 132 has a corresponding magnetic sensor 104 of array 134 that is elevationally the same height or distance from ground level 118, that is, in the same horizontal plane. In other embodiments of the invention, at least one magnetic sensor in one array is positioned a vertical distance that is staggered relative the vertical distance or position of any one of the other magnetic sensors in the opposite column. That is, in this other embodiment, the at least one magnetic sensor is not in the same horizontal plane with any one of the other magnetic sensors.

Still referring to FIG. 1, a passageway or gateway 108 (doorway, or aperture, or portal passageway) is defined by portal frame 106, and more specifically, defined by inner walls of respective vertical portions 110 and 112 and an inner wall of a horizontally extending portion 113 of portal frame 106. Passageway 108 defines an entrance opposite an exit configured for allowing items and/or persons to pass through the security screening system 100 for inspection. A center of passageway 108 defined horizontally between respective sensors 102, 104 is represented by center line 120 extending vertically. An exemplary horizontal distance between the center line 120 and any one magnetic sensor 102, 104 is represented by distance line 122. Various exemplary portal structures are described and disclosed in U.S. Pat. No. 6,150,810, the entire disclosure of which is incorporated herein by reference.

Still referring to FIG. 1, each magnetic sensor 102 and 104 comprises a scanning region for sensing or measuring a gradient in the ambient magnetic field and outputs magnetic data (output or response signal) representative of the gradient. For example, in an embodiment of the invention, each magnetic sensor 102 and 104 is a passive sensor that measures the gradient in the ambient magnetic field produced by the Earth. Collectively, the scanning regions of respective magnetic sensors 102 and 104 define or form a sensing or screening region of system 100 that extends within the passageway 108. In one of the various embodiments of the invention, the screening region of system 100 will encompass an entirety of the passageway 108. In other embodiments of the invention, the screening region of system 100 will encompass less than an entirety of the passageway 108 of system 100.

Still referring to FIG. 1, exemplary magnetic sensors or magnetometers 102 and 104 include magnetic sensor boards and gradiometers according to various embodiments of the invention. Moreover, exemplary electrical power is provided from an exemplary facility, such as an airport (not shown), to magnetic sensors 102 and 104 via a power bus 114. Magnetic sensors 102 and 104 in respective opposite vertical portions 110 and 112 of portal frame 106 are coupled separately and discretely to a processor 115 or microprocessor via a power bus 114. An exemplary processor is a digital signal processor 115. The separate and discrete circuitry allows for separate and distinct signals, which are specifically tailored for and provided to the respective magnetic sensors 102 and 104. Additionally, magnetic sensors 102 and 104 in respective opposite vertical portions 110 and 112 of portal frame 106 are interconnected 116 via a combination of hubs and power supplies (not shown). It should be understood that according to exemplary embodiments of the invention, the array of magnetic sensors 102 and 104 can have a plurality of arrangements and configurations to further define the screening region of system 100. For example, magnetic sensors 102 and 104 can be provided in horizontally extending portion 113 of portal frame 106 to extend generally in a horizontal orientation, and/or in floor portions that support the portal frame 106 to extend generally in a horizontal orientation.

Moreover, in some embodiments, system 100 can optionally include one or more trigger devices (not shown) that signal when a person or object is approaching the entrance and leaving the exit of passageway 108 of portal frame 106. Activating the trigger device prompts system 100 to initiate a screening or measurement event and obtain magnetic data of the person or object passing through system 100. Alternatively, system 100 can be prompted by other methods and means. For example, a person operating system 100 can manually initiate a screening or measurement event and obtain magnetic data.

Figure 2:
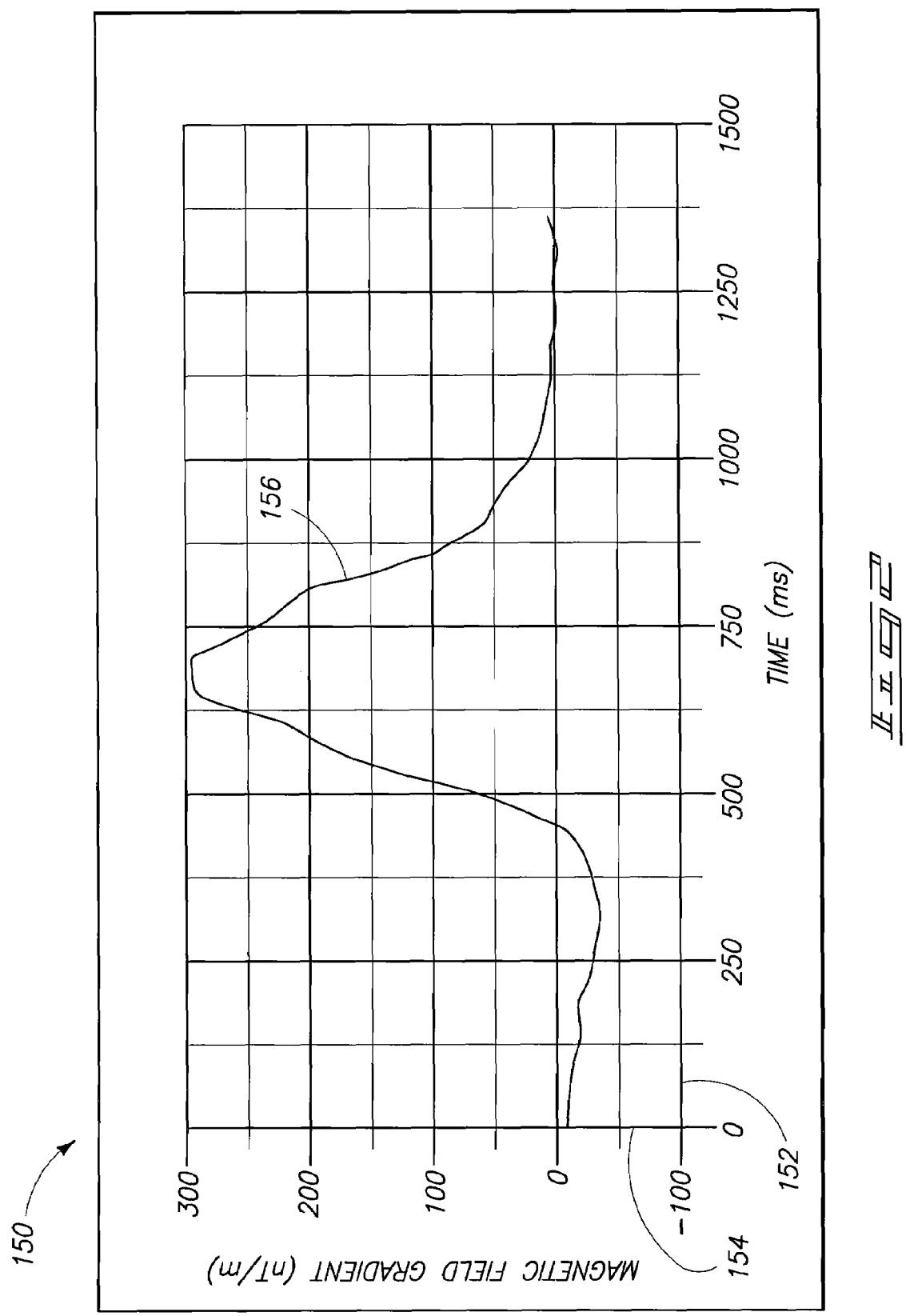
FIG. 2 is a graphical representation of magnetic data obtained from a magnetic sensor according to one of various embodiments of the exemplary security screening system of FIG. 1 during an exemplary measuring event with an exemplary ferrous object passing through the portal passageway.

Referring to FIG. 2, an exemplary graphical representation 150 is illustrated according to one of various embodiments of the invention representing magnetic data outputted or registered by a single magnetic sensor. The magnetic data represents a ferrous or ferromagnetic object being sensed or measured by the single magnetic sensor as the ferrous object passes by the sensor through the passageway 108 of system 100 (FIG. 1). The graphical representation 150 shows a response or output curve 156 illustrating magnetic field gradients resulting from the presence of the ferrous object and sensed by the single magnetic sensor over a duration or period of time. Accordingly, output curve 156 is a two-dimensional plot having a vertical axis 154 representing values for magnetic field gradients (in units of nanotesla/meter) and a horizontal axis 152 representing values for specific points in the period of time (in units of milliseconds). The exemplary single magnetic sensor can be characterized as a first magnetic sensor for the purpose of distinguishing the first magnetic sensor relative other sensors to be discussed subsequently.

It should be understood that as the ferrous object passes within the scanning region of the first magnetic sensor (and sensing or screening region of system 100), the first magnetic sensor senses, measures, outputs and/or registers the gradient or change in the orientation of the Earth's magnetic field. The sensed gradient is outputted as a magnetic signal or response, collectively over the period of time termed magnetic data, and is illustrated as output curve 156 of FIG. 2. Correspondingly, since respective scanning regions of each magnetic sensor collectively represent a sensing or screening region of system 100, the gradient induced by the ferrous object can be registered or outputted by other sensors of system 100 during the same measuring or sensing event. However, it should be understood that the shape of the response curve representing the magnetic data of the other sensors depends on the relative distance between the ferrous object and the other sensor. That is, respective differences in distances from respective sensors to the ferrous object influence the shape of the respective curves because the strength or magnitude of the magnetic field gradients being registered by the respective magnetic sensors are different. Accordingly, the shape of each curve representing the magnetic data for each magnetic sensor is influenced by the distances between the ferrous object and the respective magnetic sensors.

For example, still referring to FIG. 2, the large variation in output curve 156 over the period of time is a strong indication that the ferrous object exists in system 100 and has passed within the scanning region of the single magnetic sensor. Moreover, it should be understood that each magnetic sensor 102 and 104 of system 100 may provide magnetic data of the same sensing or measurement event produced by the same ferrous object passing through system 100. Of course, as stated previously, each curve representing magnetic data of each magnetic sensor of system 100 will vary depending on the distances between the ferrous object and each respective magnetic sensor of system 100.

Figure 3:
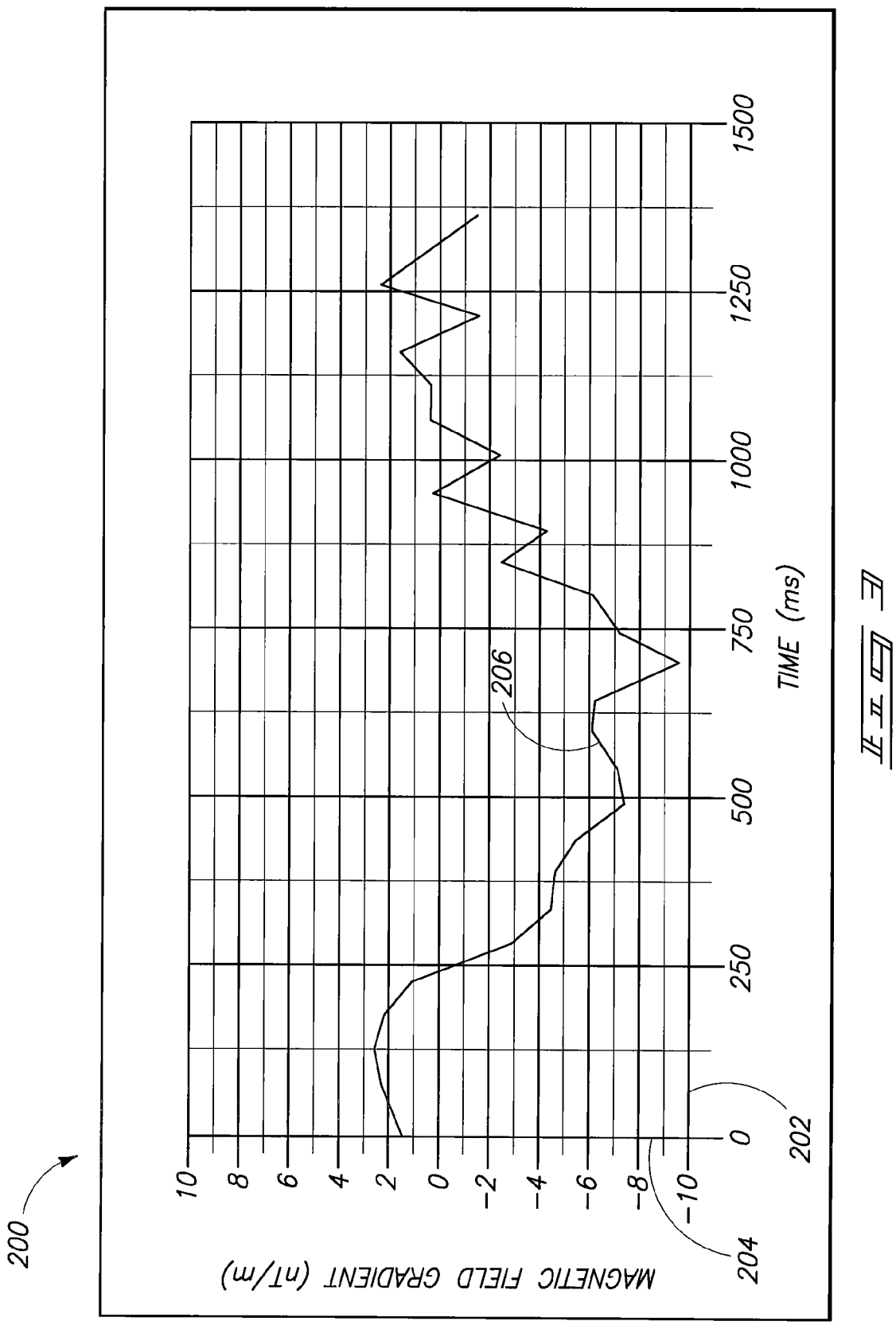
FIG. 3 is a graphical representation of magnetic data obtained from another magnetic sensor of the FIG. 1 security screening system during the same measuring event of FIG. 2, wherein the another magnetic sensor is positioned at a greater distance from the passing ferrous object.

For example, referring to FIG. 3, graphical representation 200 illustrates the same sensing or measuring event for the same ferrous object passing through system 100 as illustrated in FIG. 2. However, FIG. 3 illustrates the response or output signal (magnetic data) from another, second magnetic sensor of system 100 that is positioned at a different distance from the ferrous object relative the first magnetic sensor of FIG. 2. Response curve 206 of FIG. 3 is different from response curve 156 of FIG. 2, due to the differences in respective distances from the ferrous object as it passes through system 100. In fact, output signals from respective first and second magnetic sensors are so different that respective graphical representations 150 and 200 must use different scales for the values of magnetic field gradients along the respective vertical axes 154 and 204, while the scales for horizontal axes 152 and 202 indicate elapsed time. The scale of magnetic field gradients for FIG. 2 is from −100 nT/m to 300 nT/m and the scale of magnetic field gradients for FIG. 3 is from −10 nT/m to 10 nT/m. Accordingly, the scale difference of FIG. 3 is an order magnitude different from the scale of FIG. 2. If vertical axis 204 of FIG. 3 had the same scale as the vertical axis 154 of FIG. 2, response curve 206 of FIG. 3 would be substantially a horizontal straight line and, therefore, would not provide any useful magnetic data information. Moreover, response curve 156 of FIG. 2 clearly indicates the ferrous object is being detected by the first magnetic sensor while response curve 206 of FIG. 3 indicates that background noise and/or interference is detrimentally affecting the output signals (magnetic data) from the second magnetic sensor.

Referring to FIG. 4, graphical representation 250 illustrates the magnetic response from security screening system 100 where no ferrous object exists within any one scanning region of any one magnetic sensor 102 and 104. Ideally, the response curve 256 of FIG. 4 would be a horizontal line to clearly indicate no ferrous object is being sensed. However, response curve 256 has undulations that are due to small DC output components from the exemplary magnetic sensor. The small DC output signals occur because the magnetic sensors 102 and 104 are configured to continuously null gradients resulting from environmental factors affecting the ambient magnetic field. Such environmental factors include the far-field and local disturbances discussed previously.

Data analysis methods according to various exemplary embodiments of the invention are described, which negate or null the DC components or offsets caused by the large and small environmental influences on the ambient magnetic field. Additionally, data analysis methods according to various exemplary embodiments of the invention are described to detect and locate ferrous objects passing within the screening region of the security screening system 100. These exemplary data analysis methods comprise detection and location methods that increase the operational capabilities and selectivity of security screening systems.

An exemplary data analysis method according to one of various embodiments of the invention is appropriately termed the feature extraction method. The feature extraction method is performed on the magnetic data received from the security screening system 100 wherein each magnetic sensor (also referred to as "sensor") individually detects or senses a gradient. The feature extraction method processes the magnetic data or raw magnetic data (output signals or responses of raw gradient data) from each sensor. In exemplary various embodiments of the feature extraction method, three separate and distinct values are reached: 1) a summary gradient value for each sensor; 2) a total power value of the gradient signal detected by each sensor; and 3) a dimensionless ratio of time value configured as the first instant in the time period window that each sensor detects an object over or relative the entire time period window.

Referring to FIG. 5, a first step 400 of the feature extraction method is described. The method includes several sub-steps. In sub-step 402 of first step 400, raw magnetic data from each magnetic sensor is acquired and configured the same as presented in FIGS. 2-4. That is, during a measurement event, the raw magnetic data can be configured as response curves of magnetic field gradient values (also referred to as "gradients") being outputted from each sensor and plotted with respect to a period of time. An exemplary span or period of time selected for acquiring the magnetic field gradients includes a period of about 1,500 milliseconds. However, any exemplary period of time can be selected for obtaining the magnetic field gradients and can depend on a specific purpose for gathering the magnetic data, that is, application specific. For ease of discussion, it should be understood that the feature extraction methods are described generally with respect to the output of a single magnetic sensor. In actuality, the feature extraction methods are performed on all magnetic data for each sensor of system 100 substantially at the same time.

Still referring to FIG. 5, sub-step 404 comprises determining a maximum value and a minimum value of the magnetic field gradients within the selected period of time from sub-step 402. Moreover, a determination is made where each of the maximum and minimum values occur in the period of time.

Still referring to FIG. 5, sub-step 406 comprises determining the difference between the maximum and minimum values computed in sub-step 404 and arriving at a summary magnitude value of the magnetic field gradient that is detected by each sensor. That is, a single summary magnitude value is computed to summarize the raw magnetic data configured in sub-step 402 for each sensor.

Still referring to FIG. 5, sub-step 408 comprises assigning a sign (positive (+) or negative (−)) to the summary magnitude value of sub-step 406 based on the sign of the larger magnitude between respective maximum and minimum values.

Referring to FIG. 6, a second step 440 of the feature extraction method is described. For sub-step 442 of the second step 440, again, the output signals or raw magnetic data of each sensor is used and configured into response curves similar to FIGS. 2-4 and sub-step 402 of the first step 400. That is, during a measurement event, the raw magnetic data can be configured as response curves of values for magnetic field gradients being outputted from each sensor and plotted with respect to a period of time.

Still referring to FIG. 6, sub-step 444 of the second step 440 comprises performing a point-by-point Fast Fourier Transform (FFT) on the gradients of the response curve from sub-step 442 for each sensor. The FFT computation provides FFT values for each sensor as a function of frequency (in the frequency domain). The FFT values essentially comprise digital samples or data as a function of frequency wherein the FFT values are characterized as an analog signal. The FFT values comprise sample bins of FFT values, which are based on specific numerical values for the frequency variable. For example, a first bin of FFT values can be selected to represent FFT values with the frequency variable equaling zero, that is, the FFT value at the zero frequency. The FFT values at the zero frequency essentially represent the DC offset component or value for the raw magnetic data. The DC offset value represents the mean value of the response curve for the raw magnetic data. Accordingly, alternatively, the DC offset value can be determined by computing the mean value of the response curve for the raw magnetic data.

Still referring to FIG. 6, sub-step 446 of the second step 440 comprises manually setting the first bin of FFT values, which represent the zero frequency, to equal zero. This has the effect of subtracting or eliminating (nulling or negating) the DC offset components or value existing in the magnetic data for respective sensors. Accordingly, the detrimental environment influences on the magnetic data described previously is, at least partially, negated.

Still referring to FIG. 6, sub-step 448 of the second step 440 comprises, with the first bin of FFT values being set to zero, performing an inverse FFT computation on the FFT values in the frequency domain to convert (or revert) the FFT values back into the time domain (values as a function of time). The computation of this sub-step 448 provides reverted FFT values or reverted data values.

Still referring to FIG. 6, sub-step 450 comprises forming a response curve by connecting the reverted data values of sub-step 448 with a line.

Still referring to FIG. 6, sub-step 452 of the second step 440 comprises computing "power in the signal" values (also referred to as "signal power values" and/or "integrated signal power") for each sensor using the reverted FFT values of sub-step 448. This computation is performed by determining the area under the response curve. That is, integrating the function of the response curve. The area will include or extend under the response curve to a line corresponding to a zero (0) baseline for the gradient values (the zero baseline). Additionally, this computation of sub-step 452 uses the absolute values of the negative values of the reverted FFT values so such negative values do not subtract from the computed signal power values. That is, the absolute values of the negative values of the reverted FFT values are added to the positive values of the reverted FFT values before the integration is performed. This computation of sub-step 452 can be referred to as the "signal power method" and determines a total power value of the signal (integrated signal power) for the raw magnetic data detected by each sensor.

Figure 7A:
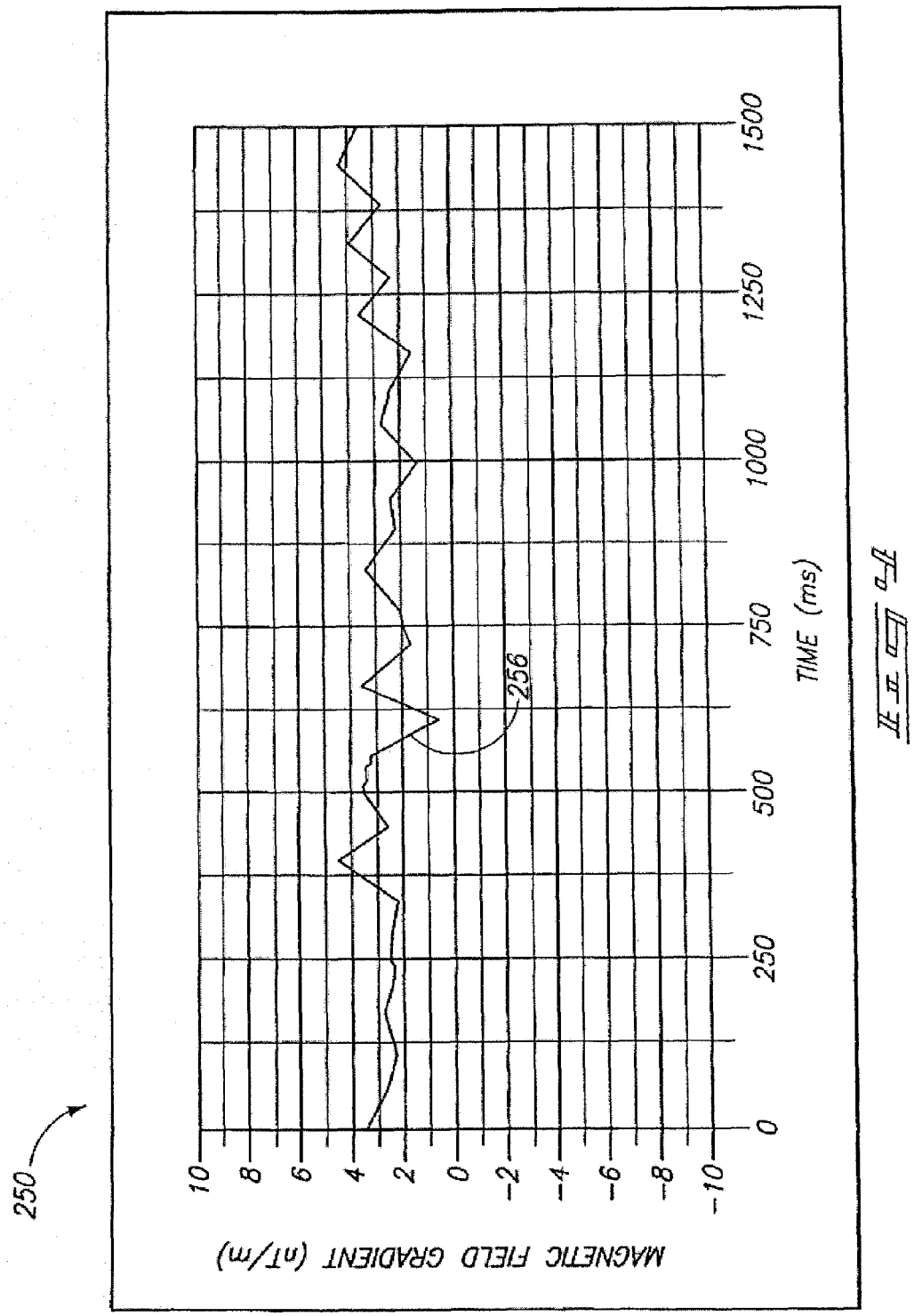
FIG. 7 is an exemplary data analysis method according to one of various embodiments of the present invention.

Referring to FIG. 7, a third step 480 of the feature extraction method is described. Sub-step 482 comprises sensing a magnetic field for a period of time. The sensing or measurement event produces output signal or raw magnetic data of each sensor. The raw magnetic data is used and configured into response curves similar to FIGS. 2-4. That is, the raw magnetic data can be configured as response curves for value(s) of magnetic field gradient(s) being outputted from each sensor and plotted with respect to the period of time.

Still referring to FIG. 7, sub-step 484 of the third step 480 comprises detecting a gradient within the magnetic field during the period of time wherein the raw magnetic data represents the magnetic field gradients in the magnetic field. As stated previously, the raw magnetic data is configured into the response curves.

Still referring to FIG. 7, sub-step 486 of the third step 480 comprises identifying a peak or maximum value (in an absolute value sense) of the gradient detected during the period of time and which are outputted from each magnetic sensor and represented in the response curve of sub-steps 482 and 484.

Still referring to FIG. 7, sub-step 488 of the third step 480 comprises identifying a portion of time within the period of time that represents when the peak value of sub-step 486 occurs.

Still referring to FIG. 7, sub-step 490 of the third step 480 comprises configuring the portion of time over the period of time to represent a ratio. The ratio has as a numerator the specific point in time that the peak gradient value of sub-step 486 occurs over a denominator, which comprises the entire period of time. This dimensionless ratio of times (time over time) value represents the first instant in the time period window that each sensor detects an object over or relative the entire time period window. Moreover, this dimensionless ratio of times is used to determine whether a ferrous object is located in the front area or the back area of a body passing through the portal passageway 108 of security screening system 100. That is, the position of the object relative to the body is determined by comparing the ratio of when the object is first detectable within the signal over the total duration of the sample period of time. If the ratio value is less than 0.5, the interpretation is made that the object is positioned or located in the front area of the body. If the ratio value is greater than 0.5, the interpretation is made that the object is positioned or located in the back or rear area of the body. Additionally, an interpretation as to how forward an object is positioned relative the body can be determined by how small the ratio value is, that is, the smaller the ratio value, the closer to the front of the body the object is positioned.

The above exemplary various embodiments of the feature extraction methods are completed and provide individual magnetic sensor data that is summarized using the "features" data computed above. Various other embodiments of data analysis methods are now described which verify detection and provide location information for a ferrous object within portal passageway 108 of system 100. These additional data analysis methods can be characterized as the "composite portal analysis and object location methods" (hereinafter, also referred to as the "object location methods"). The object location method is directed to determining the location of a ferrous object within a passageway wherein the location includes a vertical aspect relative to the ground level and a horizontal aspect relative to a lateral distance from at least one sensor or sensor array (alternatively stated, relative a lateral distance from one column of magnetic sensors).

To illustrate various exemplary embodiments of the object location methods, the computations to be described were based on output responses from sensors in a security screening system, such as system 100, measuring or sensing a ferrous object positioned in a portal passageway (for example, portal passageway 108) at the following location: 1) a ferrous object (hereinafter, also referred to as an "object") placed in a front shirt pocket of a person passing through portal passageway 108 of system 100 (FIG. 1); and 2) the pocket positioned approximately 46 inches above ground level 118 and approximately 6 inches laterally of center line 120 of portal passageway 108.

Referring to FIG. 8, a first embodiment 501 of various steps of an object location method 500 is described and comprises determining an initial vertical position of an ferrous object within the portal passageway. In sub-step 502, signal power values (integrated signal power) are computed for each sensor of system 100. The signal power values are computed from the "signal power method" as previously described with respect to the feature extraction method (second step 440) illustrated in FIG. 6 (particularly, sub-step 452).

Still referring to FIG. 8, in sub-step 504, a vertical position value is assigned for each signal power value wherein the vertical position value represents the vertical positive relative the ground level for each sensor outputting the corresponding signal power value (see graphical representation 530 of FIG. 9 and discussed below). That is, each signal power value is represented as a function of respective vertical positions of the magnetic sensor that outputted the signal power value.

Still referring to FIG. 8, in sub-step 506, a threshold value is selected for the signal power values. The criteria for selecting the threshold value will depend on the type or characteristics of the magnetic sensor being used in system 100 wherein the threshold value selected will essentially represent sensor instability and electronic noise for the characteristic of the sensor used. That is, relying on signal power values greater than the threshold value for subsequent calculations or computations will effectively negate or null sensor instability and electronic noise from the calculations for the particular sensor being used. It should be understood that this sub-step 506 of selecting the threshold value could have been performed previously as sub-step 502 or sub-step 504. Moreover, as explained previously, different threshold values can be implemented for different exemplary magnetic sensors having different operational features and/or characteristics. For example, one exemplary security screening system uses an exemplary threshold value of five (5) nT/m/sec (nanotesla/meter/second) (also characterized as units of "gradient-seconds" represented as (nT/m)/s).

Still referring to FIG. 8, sub-step 508 comprises determining peak or maximum value(s) of the signal power values that are greater than the threshold value. It should be understood that this definition of peak or maximum value(s) includes any local spikes or peaks in the response curves for the signal power values. Accordingly, there may be a plurality of peak signal power values for respective response curves.

Still referring to FIG. 8, sub-step 510 interprets each peak signal power value as indicating or representing the detection of a ferrous object. Sub-step 510 further includes determining the vertical position value corresponding to each peak value and interpreting the vertical position value as indicating a vertical location of the ferrous object relative to the ground level 118 of system 100.

Referring to FIG. 9, graphical representation 530 (also referred to as an integrated signal power plot) illustrates the signal power values (integrated signal power) plotted as a function of the respective vertical position of the magnetic sensor that outputted the corresponding signal power value. Graphical representation 530 comprises two response curves 536 and 538 of the signal power values. The two response curves 536 and 538 represent the two respective columns 110 and 112 of portal structure 106 having arrays 132 and 134 of sensors 102 and 104 in portal structure 106 for system 100 (FIG. 1). A horizontal axis 532 of graphical representation 530 represents the signal power values for each sensor and a vertical axis 534 represents vertical position values (in units of feet) from ground level 118 of system 100.

Still referring to the graphical representation 530 of FIG. 9, the response curves 536 and 538 have one peak signal power value corresponding to a vertical position value of approximately four feet. This vertical position value is interpreted as the vertical location of the ferrous object which corresponds closely to the actual placement of the ferrous object in the pocket of the person passing through system 100. It should be understood that if a plurality of peak signal power values exist, each one can be processed as if each represents an indication and location of a different and separate ferrous object. Accordingly, the object location method 500 may indicate a plurality of ferrous objects. Subsequent data analysis methods and processing are discussed to more thoroughly discern if a plurality of peak signal power values accurately indicates a plurality of ferrous objects.

The above computation finishes the initial vertical position determination of the ferrous object according to the first embodiment 501 of the object location method 500. A horizontal aspect or position of the ferrous object can now be determined. After determining this horizontal aspect of the ferrous object, a data analysis method is presented which computes a final vertical position of the ferrous object.

It should be understood that a horizontal position is defined as a horizontal distance between a ferrous object and a magnetic sensor or column of either one of the pairs of arrays 132 and 134 of system 100. For example, returning to FIG. 1, an exemplary distance is represented by distance line 122 that extends between center line 120 and one of sensors 104 (any one sensor 104) in the right-hand array 134 of system 100. Exemplary distance line 122 is perpendicular to center line 120 and parallel to ground level 118. It should be understood that a horizontal distance can be determined that extends between center line 120 and a sensor 102 (any one sensor 102) in the left-hand array 132 of system 100. If the center line 120 is close to being at the center of the passageway 108, then distance line 122 will approximately equal a horizontal distance between any one sensor 102 and center line 120.

To determine the horizontal aspect of the ferrous object, begin with the peak signal power values (also referred to as "integrated signal power peaks") computed and interpretations realized in respective sub-step 508 and sub-step 510 from the first embodiment 501 of the object location method 500. That is, ferrous object(s) previously located with respect to the vertical aspect of the object location method 500 are now used to determine the horizontal location of the ferrous object(s). This horizontal determination relies upon a $1/r^2$ model wherein "r" is the horizontal distance between the ferrous object and the nearest sensor in the left column or left array 132. The "nearest sensor" is defined with respect to two aspects for "nearest." In the first aspect, referring to FIG. 1, the "nearest sensor" is the sensor nearest to the ferrous object as between respective sensors 102 and 104 of respective arrays 132 and 134. In the second aspect, assuming the magnetic sensors 102, 104 of system 100 are configured as gradiometers having at least a pair of sensors, the "nearest sensor" is the sensor of the pair that is closer to the portal passageway 108 of system 100.

The $1/r^2$ model mentioned above is represented by the following equation:

$$I = I_o * \frac{1}{r^2}, \text{ where:}$$

$I_o$=Integrated signal power (signal power value) of the magnetic field at the ferrous object r=Horizontal distance (as defined previously) from the ferrous object to the "nearest" magnetic sensor (as defined previously)

I=Calculated integrated signal power (signal power value) of the magnetic field from the gradient (magnetic) data at the respective magnetic sensors (i.e., gradient values represented in graphical representation 530 of FIG. 9, that is, the integrated signal power plot)

This equation will estimate the behavior of the near-field disturbance $I_o$ (signal power value) and its intensity as a function of horizontal distance from the ferrous object. The premise is that the integrated signal power I (signal power value I) of the magnetic field at the magnetic sensor is proportional to the inverse of the distance squared from the ferrous object. The horizontal aspect is determined by noting the measured or calculated integrated signal power (signal power value) at both sides of the portal structure for the integrated signal power peak(s) of interest and solving for the integrated signal power (signal power value) at the ferrous object using gradient (magnetic) data from both sides of the portal structure (in FIG. 9, along a horizontal line from the peak value of the one response curve 538 to the other response curve 536). The integrated signal power $I_o$ at the ferrous object and the horizontal distance "r" from the ferrous object to the magnetic sensor (represented as outputting the peak value) are unknown. However, by using both sides of the portal structure, there are two equations and two unknowns to solve.

Accordingly, determining the initial horizontal position aspect of the object location method 500 comprises rearranging the $$I = I_o * \frac{1}{r^2}$$

equation for both columns of sensors (response curves 536 and 538 of FIG. 9) into the following quadratic equation for horizontal distance "r" that can be easily solved: $0=(P_r-P_l)r^2-2wP_r+P_rw^2$ where:

$P_r$=Integrated signal power at the sensor in the right side or column of the portal structure $P_l$=Integrated signal power at the sensor in the left side or column of the portal structure r=Horizontal distance from the ferrous object to the sensor in the left side or column w=Width of the portal passageway of the portal structure The quadratic equation uses the left side or column of the portal structure as a reference point (or zero point) with horizontal distance "r" increasing as a distance from the left side increases (and alternatively as distance to right side of the portal structure decreases). It should be understood that the right side or column of the portal structure could have been used as the reference point wherein horizontal distance "r" would be represented as a negative (−) value (negative in sign). Selecting the left side or column of the portal structure as the reference point results in a more conventional coordinate system. Horizontal distance "r" is a variable that spans the entire width of the passageway of the portal structure.

Accordingly, solving the quadratic equation provides the horizontal distance "r" of the ferrous object relative a sensor in the left side or left column of the portal structure. Accordingly, the ferrous object was detected as existing in the portal passageway, and an initial vertical position and a horizontal position of the ferrous object within that portal passageway has been determined.

Relying on the $1/r^2$ model just described, another embodiment of an exemplary data analysis method is described for adjusting the initial vertical position of the ferrous object, that is, a final vertical position. The initial vertical position of the ferrous object was determined as having the same vertical position as a vertical position of one of the sensors. That is, no determination of the vertical location or position of the ferrous object between respective, vertically spaced sensors. Accordingly, vertical adjustments are made using the $1/r^2$ model and comparing the measured magnetic disturbances between respective vertically spaced sensors next to or surrounding an identified peak signal power value (integrated signal power value). Between the two sensors, the one sensor outputting the larger integrated signal power value proximate the peak integrated signal power value (in gradients) will influence the determination of the location of the ferrous object in that direction (up or down) toward the one sensor.

Figure 10:
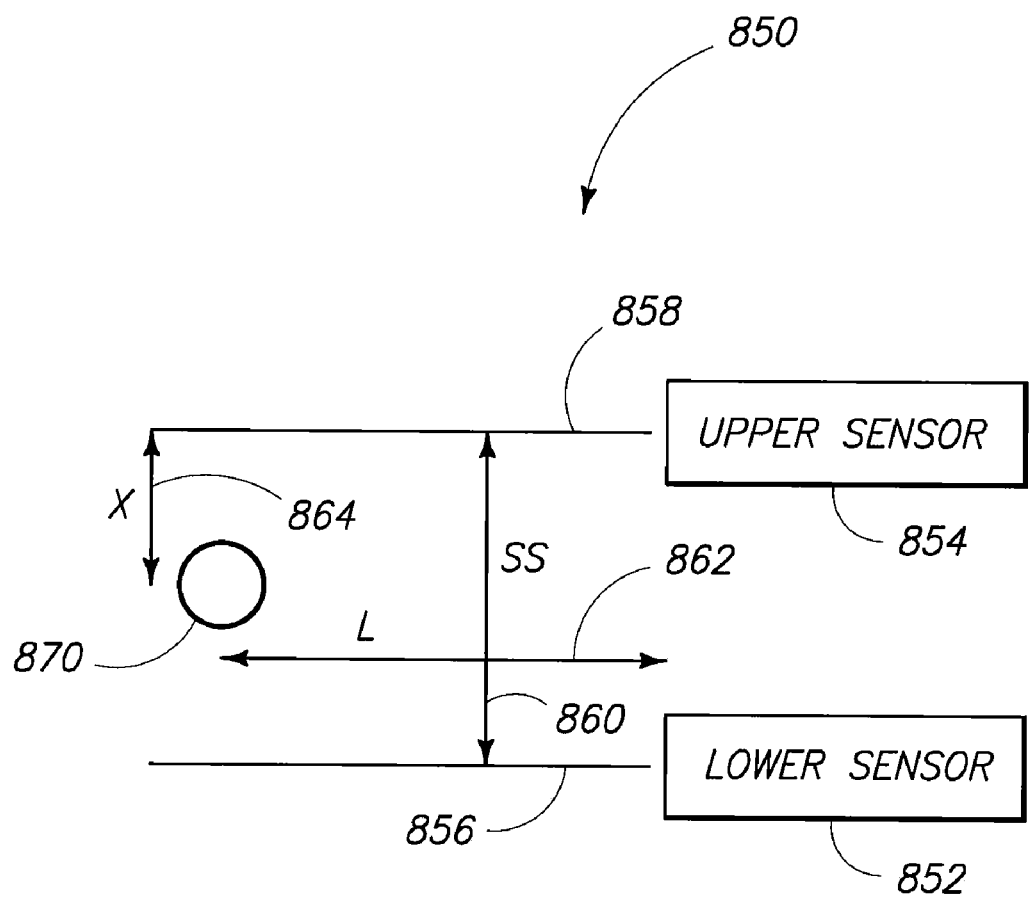
FIG. 10 is a geometric illustration of an exemplary ferrous object positioned relative vertically spaced magnetic sensors within the portal passageway of the security screening system of FIG. 1 to facilitate discussion of an exemplary data analysis method according to one of various embodiments of the present invention.

For example, referring to FIG. 10, an exemplary position of a ferrous object 870 is illustrated relative or between the exemplary geometry or configuration 850 of two vertically spaced sensors. It should be understood that the ferrous object may have an exemplary horizontal position within the portal passageway 108 of system 100 and be positioned between any two vertically spaced sensors. The vertical position of the ferrous object is determined in some embodiments by solving the following quadratic equation:

$$0 = (P_l - P_u)^* x^2 - 2^* ss^* P_l^* x + (P_l - P_u)^* L^2 + ss^2 P_l, \text{ where:} \quad (3)$$

| | |
|---|---|
| x = | Distance to solve for from the upper sensor to the object. |
| $P_l$ = | Lower sensor integrated signal power |
| $P_u$ = | Upper sensor integrated signal power |
| ss = | Sensor vertical spacing |
| L = | Horizontal distance from sensors to the object |

Still referring to FIG. 10, the geometric configurations and dimensions correspond to the variables for the above quadratic equation. Upper sensor 854 has the greater vertical height above ground level relative to a lower sensor 852. Ferrous object 870 is positioned vertically between lower and upper sensors 852 and 854, respectively. Distance 864 between the ferrous object 870 and upper sensor 854 is represented by variable "X" and is the dimension to be solved as the other variables are previously selected or computed/determined. Horizontal line 856 represents the elevational location of lower sensor 852 for measurement purposes. Horizontal line 858 represents the elevational location of upper sensor 854 for measurement purposes. Distance 860 represented by variable "SS" is the preselected dimension of vertical spacing between sensors 852 and 854 and is illustrated as between respective horizontal lines 856 and 858. Distance 862 between the ferrous object 870 and array of sensors (assuming sensors are aligned vertically in the vertical column or portion 110 of portal structure 106) is represented by variable "L". Distance 862 (variable "L") is the horizontal dimension r computed previously using the initial horizontal position aspect of the object location method 500 (FIGS. 8 and 9).

Regarding the above described exemplary data analysis methods using integrated signal power methodologies, such methods may produce anomalies for some structural designs or configurations of ferrous objects. That is, two or more ferrous objects may be allegedly detected or indicated when only one ferrous object exists in the portal passageway 108. For example, two or more integrated signal power peaks (peak signal power values) called "ghost alarms" may be present in the integrated signal power curves for a single ferrous object. Exemplary structural designs that produce ghost alarms characteristically have one dimension that is significantly thin and longer relative to any other dimension of the ferrous object. This configuration of a ferrous object (also referred to as "ghost object") tends to produce separate and distinct magnetic field poles; a positive pole and a negative pole. These separate and distinct poles are detected by the array of sensors, which influences the shape of the integrated signal power curves relied upon for implementing the embodiments of the object location method 500.

For example, as the magnetic field changes from one pole to the other, the shape of the response curve dips or has a null region (local minimum value) leaving two local maximum values (or two integrated signal power peaks) in the response curve. That is, an ideal response curve for a single ferrous object will have a single integrated signal power peak with a steadily increasing and decreasing shape (laterally extending bell curve) as illustrated in FIG. 9. However, the response curve for ghost object(s) will have at least two integrated signal power peaks giving the impression that there are two separate ferrous objects when there is only a single ferrous object. To address ghost alarms, a ghost alarm reduction method 580 according to various embodiments of the invention is used to identify and resolve ghost alarms. Various exemplary embodiments of the ghost alarm reduction method 580 rely on a series of "fuzzy logic" rules to consolidate the ghost alarms into a single integrated signal power peak in the response curve when a single ferrous object exists in portal passageway 108 of system 100.

Figure 13:
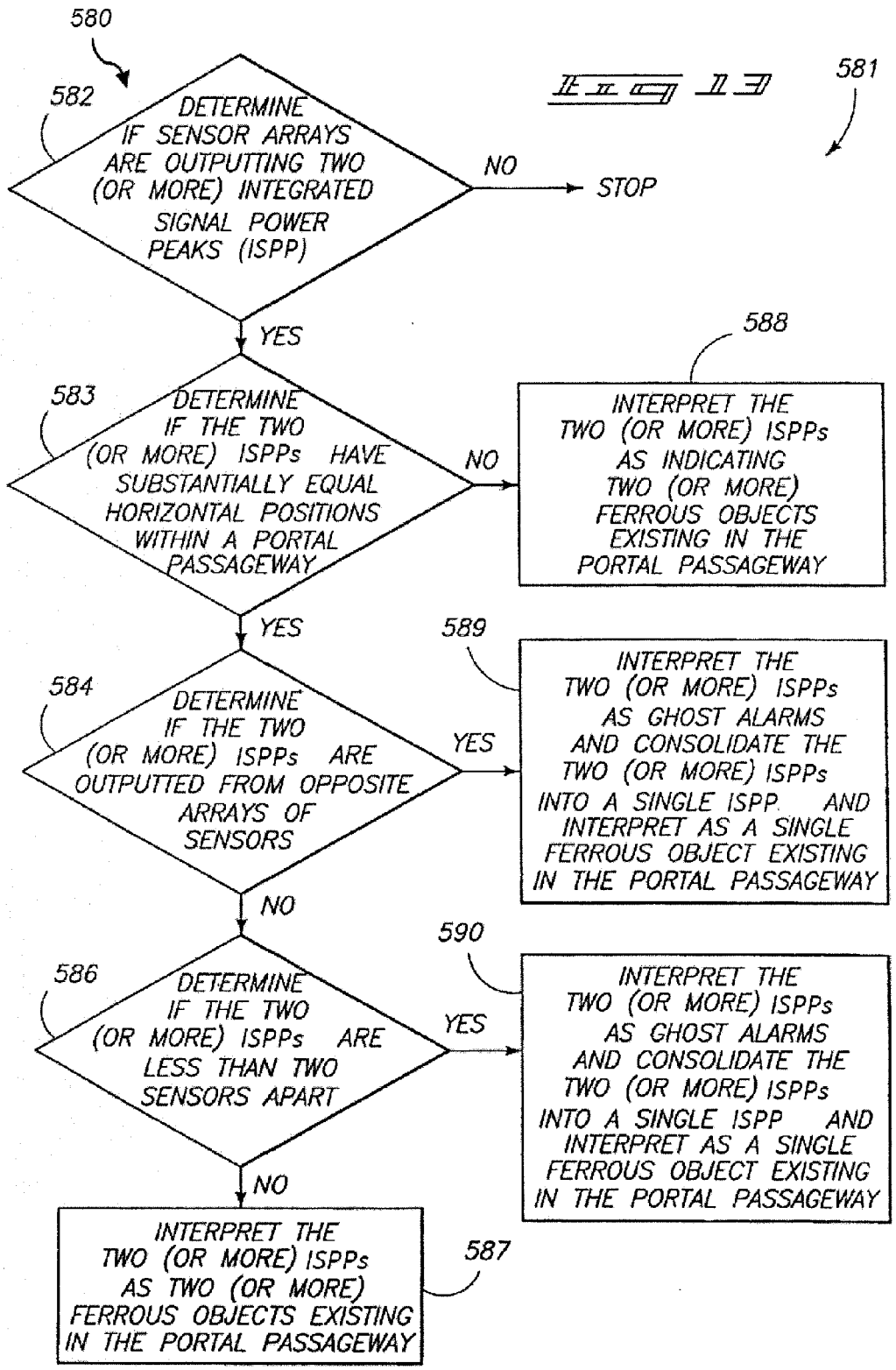
FIG. 13 is an exemplary data analysis method according to one of various embodiments of the present invention.

For a first exemplary embodiment 581 of the ghost alarm reduction method 580, consider FIG. 13. In step 582 of FIG. 13, a determination is made as to whether the arrays or columns of sensors are outputting two or more integrated signal power peaks (ISPP). If yes, proceed to step 583. If no, stop.

Still referring to FIG. 13, in step 583, a determination is made as to whether any two of the integrated signal power peaks (ISPPs) have substantially equal values for horizontal positions or horizontal distances relative the left column of the portal structure (previously calculated as horizontal distance "r"). If no, proceed to step 588 and interpret the integrated signal power peaks as indicating a separate ferrous object for each integrated signal power peak, that is, two or more ferrous objects existing in the portal passageway, and then stop. If yes, proceed to step 584.

Still referring to FIG. 13, in step 584, determine if the two integrated signal power peaks are outputted from opposite arrays or columns of sensors, for example, by locating one peak value in each one of the two response curves. If no, proceed to step 586. If yes, proceed to step 589 and interpret the two integrated signal power peaks as representing ghost alarms and consolidate the two integrated signal power peaks into a single integrated signal power peak, and then stop. Accordingly, the single integrated signal power peak should be interpreted as representing a single ferrous object existing in the portal passageway. Additionally, the single ferrous object may be interpreted as representing a large ferrous object.

The rationale or logic for consolidating the two integrated signal power peaks is based on the following assumptions: a) that the peak values were generated by a single, long and slender object; and b) the single, long and slender object was oriented at an angle with respect to the vertical axis of the portal passageway 108. In this orientation of the single, long and slender ferrous object, one of the magnetic poles produced by the ferrous object was "cast" to (or was detected by) an elevationally different sensor (lower or higher), which was located in the opposite column (opposite side) of the portal structure 106. In the integrated signal power curve, the consolidation will provide the single integrated signal power peak centrally between the two original integrated signal power peaks, in both the vertical aspect and the horizontal aspect. It should be understood that generally, the greater move or repositioning will occur in the vertical aspect of the curve, that is, along the vertical axis of the curve since the two original integrated signal power peaks were nearly equal along the horizontal axis (i.e., had substantially equal horizontal positions). Accordingly, not much repositioning is needed along the horizontal axis, or in the horizontal aspect of the response curve.

Moreover, it should be understood that because the two integrated signal power peaks were determined in step 584 not to be outputted from the two opposite arrays or columns of sensors, to conclude that the only other orientation is that the two integrated signal power peaks are outputted from the same column and array of sensors, and to go to step 586.

Still referring to FIG. 13, in step 586, determine if the two integrated signal power peaks are less than two sensors apart. If yes, proceed to step 590 and interpret the two integrated signal power peaks as representing ghost alarms and consolidate the two integrated signal power peaks into a single integrated signal power peak. Also at step 590, interpret the single integrated signal power peak as representing a single ferrous object, and then stop. If the two integrated signal power peaks are not less than two sensors apart in step 586, proceed to step 587 and interpret the two integrated signal power peaks as representing two ferrous objects existing in the portal passageway, and stop.

The rationale or logic for combining these two integrated signal power peaks outputted from the same array of sensors is because the features of the long ferrous object provide the positive and negative magnetic poles that are clearly resolvable by the sensors. As the response curve registers (or outputs) the transition of one magnetic pole to the other, as stated previously, the response curve goes through a null region that appears to the sensors to be void of ferrous material or an object. It should be understood that this logic assumes that the sensors are not capable of resolving or discerning signatures or outputs from two large ferrous objects that are closer than the distance between two vertically spaced sensors.

The ghost alarm reduction method 580 consolidates the ghost alarms whether they occurred as signals from a single column of portal structure 106 or from opposite columns of system 100. Another exemplary method for addressing ghost alarms and locating ferrous object positions is based on the analyses and methods disclosed in U.S. Pat. No. 6,150,810 that were based on maximum signal methods. These maximum signal methods can be used to supplement the integrated signal power data analysis disclosed in the present application. To summarize, the maximum signal methods reduce the magnetic data acquired from each sensor during the magnetic data acquisition period into a single maximum gradient value. Comparing the graphical representation (plot) of gradient values using the maximum signal analysis with the graphical representation (plot) of gradient values using the integrated signal power analysis demonstrates how the maximum signal analysis resolves ghost alarms.

Consider outputted magnetic data from the same ferrous object, for example a small gun, having one dimension that is significantly longer than the other dimensions. The gun is positioned approximately 44 inches above ground level 118 on the right side of portal passageway 108 (right of center line 120 of FIG. 1). As stated previously, ferrous objects having one long dimension produce a magnetic field with separate and distinct magnetic poles (positive and negative magnetic poles) wherein the sensor configuration is capable of distinguishing the separate and distinct magnetic poles. Moreover, the magnetic field produces a null region or dip area where the polarity of the magnetic field switches from one magnetic pole to the other. This feature of the magnetic switching between the magnetic poles affects the response curves for respective analyses of the maximum signal analysis versus the integrated signal power analysis.

Figure 11:
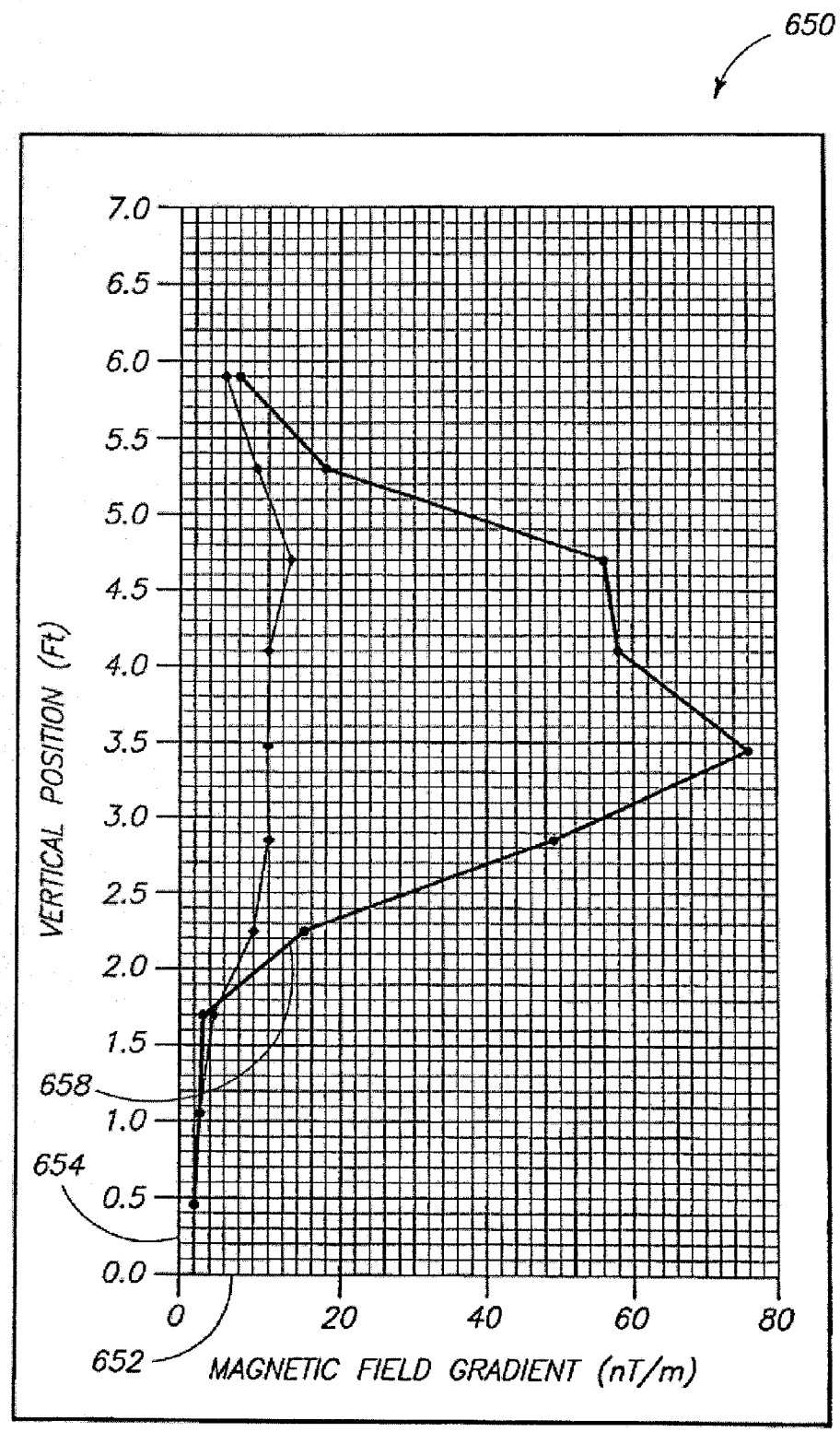
FIG. 11 is a graphical representation of magnetic data obtained from the exemplary magnetic sensors of the security screening system of FIG. 1, illustrating an exemplary data analysis method according to one of various embodiments of the present invention.
Figure 12:
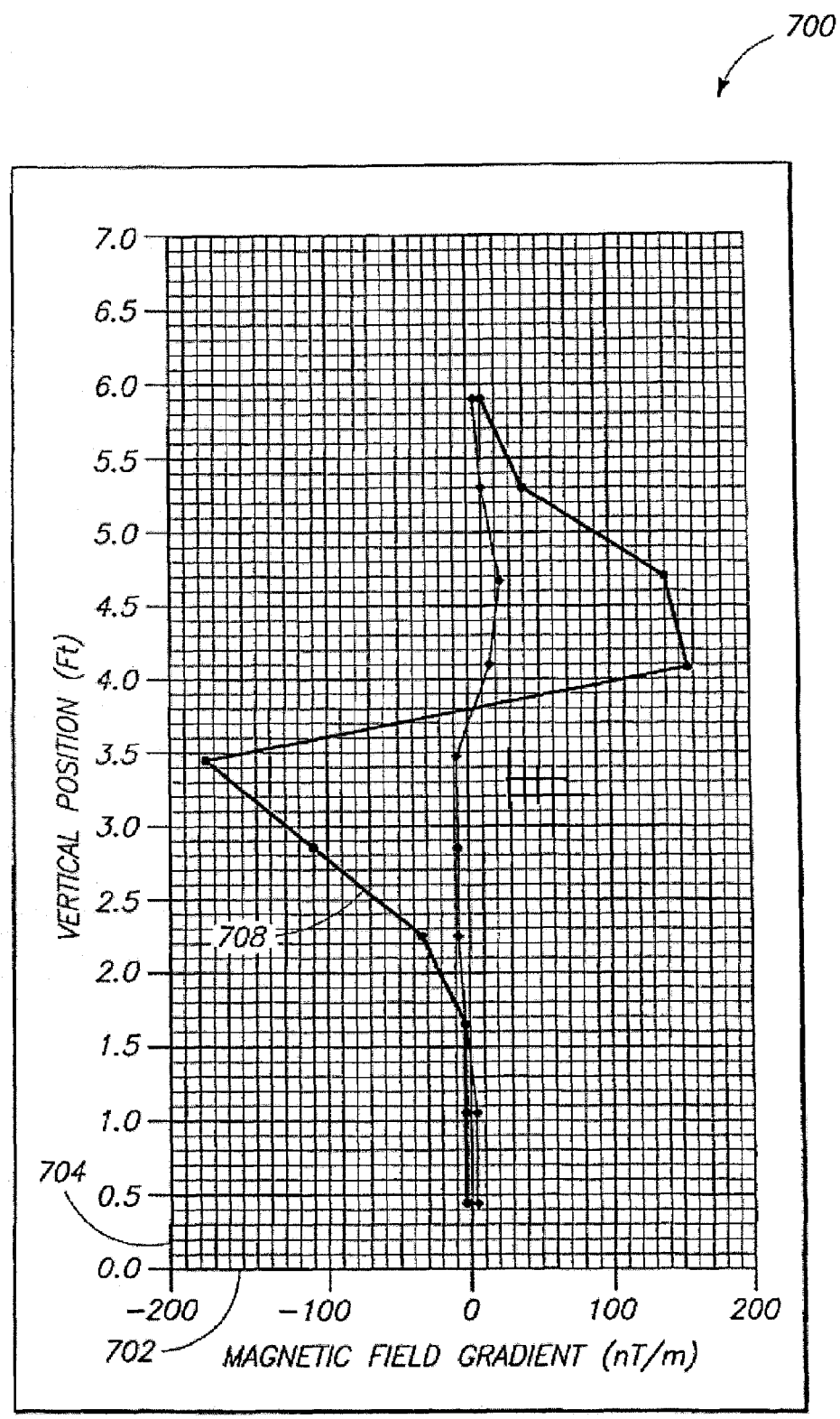
FIG. 12 is a graphical representation of magnetic data obtained from the exemplary magnetic sensors of the security screening system of FIG. 1, illustrating an exemplary data analysis method according to one of various embodiments of the present invention.

For example, referring to FIGS. 11 and 12, the graphical representation 650 (FIG. 11) of gradient values outputted from the small gun using the integrated signal power analysis is compared with the graphical representation 700 (FIG. 12) of gradient values outputted from the small gun using the maximum signal analysis. Both graphical representations 650 and 700, illustrated in respective FIGS. 11 and 12, have gradients represented along the respective horizontal axes 652 and 702 and have vertical positions in feet represented along the respective vertical axes 654 and 704. The respective response or signature curves 658 and 708 of FIGS. 11 and 12, respectively, represent the magnetic data from the sensors in the right side of the portal structure 106.

The response or signature curve 658 (FIG. 11) produced using the integrated signal power analysis (without ghost alarm fuzzy logic rules) indicates three maximum or peak values, which may be interpreted as indicating three different ferrous objects are located in the right side of portal passageway 108. In contrast, the response or signature curve 708 (FIG. 12) produced using the maximum signal analysis has a large dipole signature, which more than likely will be interpreted as indicating a single ferrous object is located in portal passageway 108. Accordingly, the maximum signal analysis is used to supplement the integrated signal power analysis, in some embodiments, for consolidating ghost alarms to more accurately indicate the existence and location of ferrous object(s) that need to be further investigated as potential weapons.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for detecting and locating ferromagnetic objects, the method comprising:
   acquiring magnetic data comprising magnetic field gradients detected during a period of time;
   representing the magnetic data as a function of the period of time;
   converting the magnetic data to being represented as a function of frequency;
   setting a first bin of values of the magnetic data represented as a function of frequency to zero; and
   reverting the magnetic data represented as a function of frequency to be represented as a function of time to produce reverted data values.

2. The method of claim 1, further comprising:
   forming a response curve of the magnetic data by connecting the reverted data values with a line; and
   computing an area under the response curve to produce a signal power value.

3. The method of claim 2, further comprising:
   providing a plurality of magnetic sensors to acquire the magnetic data;
   computing a signal power value from each magnetic sensor of the plurality of the magnetic sensors; and
   assigning a vertical position value to each signal power value, the vertical position value comprising a vertical dimension relative to ground level for each magnetic sensor of the plurality of the magnetic sensors outputting a corresponding signal power value.

4. The method of claim 3, further comprising:
   selecting a threshold value for the signal power values; and
   determining a peak value than the threshold value from a collection of the signal power values.

5. The method of claim 4, further comprising interpreting the peak value as indicating a presence of a ferrous object within a security screening system.

6. The method of claim 5, further comprising: determining a vertical position value corresponding to the peak value;

interpreting the vertical position value of the peak value as indicating an initial vertical location of the ferrous object relative to the ground level; and modifying the initial vertical location to determine a final vertical location of the ferrous object.

7. The method of claim 3, further comprising determining a horizontal position of a ferrous object from at least one magnetic sensor among the plurality of magnetic sensors.

8. The method of claim 1, wherein the converting comprises performing a Fast Fourier Transform operation.

9. The method of claim 1, wherein the first bin of values comprises values for frequency being selected to equal zero.

10. The method of claim 1, wherein the reverting comprises performing an inverse Fast Fourier Transform operation.

11. A security screening system, the system comprising:
a portal structure comprising a pair of opposing columns extending vertically and defining a passageway;
an array of magnetic sensors arranged in each one of the opposing columns and configured to output magnetic data, each magnetic sensor comprising a vertical position relative to a ground level in its associated column and being aligned with a corresponding magnetic sensor at substantially the same vertical position in the opposing column; and
a processor coupled to each magnetic sensor and configured to:
convert magnetic data from each magnetic sensor to be represented as a function of frequency;
set a first bin of values of the magnetic data represented as a function of frequency to zero; and
produce reverted data values comprising the magnetic data represented as a function of frequency reverted to be represented as a function of time.

12. The system of claim 11, wherein the processor comprises a digital signal processor.

13. The system of claim 11, wherein each magnetic sensor comprises a passive magnetic sensor.

14. The system of claim 11, wherein the portal structure comprises a horizontally extending portion connecting the opposing columns, and further comprising another array of magnetic sensors oriented in the horizontally extending portion.

15. The system of claim 11, further comprising:
a floor portion supporting the portal structure; and
another array of magnetic sensors oriented horizontally spaced in the floor portion.

16. The system of claim 11, wherein the processor is further configured to:
compute a signal power value for each magnetic sensor, the signal power value comprising the area under a response curve formed by connecting the reverted data values with a line;
identify a peak signal power value related to at least one magnetic sensor; and
associate the peak signal power value with the vertical position relative to the ground level of the at least one magnetic sensor.

17. The system of claim 16, wherein the processor is further configured to:
interpret the peak value as an indication of a ferrous object within the security screening system; and
determine a horizontal distance of the ferrous object from the related at least one magnetic sensor.

18. A method for detecting and locating ferromagnetic objects, the method comprising:
sensing a magnetic field for a period of time with a plurality of magnetic sensors arranged in an array in each of two opposing columns, each magnetic sensor among the plurality of magnetic sensors comprising a vertical position relative to a ground level in one among the two opposing columns and being aligned with a corresponding magnetic sensor at substantially the same vertical position in the other opposing column;
detecting a gradient within the magnetic field during the period of time using at least some of the magnetic sensors among the plurality of magnetic sensors;
identifying a peak signal power value of the gradient detected during the period of time, the peak signal power value being related to at least one magnetic sensor among the at least some of the magnetic sensors;
interpreting the peak signal power value as indicating a presence of a ferrous object;
determining an initial vertical position of the ferrous object, the initial vertical position comprising the vertical position of the at least one magnetic sensor related to the peak signal power value; and
determining a horizontal position of the ferrous object comprising a horizontal distance from the at least one magnetic sensor related to the peak signal power value.

19. The method of claim 18, wherein detecting the gradient within the magnetic field during the period of time using at least some of the magnetic sensors among the plurality of magnetic sensors comprises:
acquiring magnetic data comprising the gradient from each magnetic sensor;
representing the magnetic data from each magnetic sensor as a function of the period of time;
converting the magnetic data represented as a function of the period of time to being represented as a function of frequency;
setting a first bin of values of the magnetic data represented as a function of frequency to zero;
reverting the magnetic data represented as a function of frequency to be represented as a function of time to produce reverted data values;
forming a response curve of the magnetic data by connecting the reverted data values with a line; and
computing an area under the response curve to produce a signal power value for each magnetic sensor.

20. The method of claim 18, further comprising modifying the initial vertical position of the ferrous object to determine a final vertical position of the ferrous object based on a signal power value for at least two vertically spaced apart magnetic sensors in one of the two opposing columns.

* * * * *

UNITED STATES PATENT AND TRADEMARK OFFICE
CERTIFICATE OF CORRECTION

PATENT NO. : 7,652,572 B2
APPLICATION NO. : 11/539678
DATED : January 26, 2010
INVENTOR(S) : Roybal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

Page 1 of 2

PATENT NO. : 7,652,572 B2
APPLICATION NO. : 11/539678
DATED : January 26, 2010
INVENTOR(S) : Lyle Gene Roybal et al.

It is certified that error appears in the above-identified patent and that said Letters Patent is hereby corrected as shown below:

In the drawings:
    In FIG. 13, in uppermost diamond-shaped decision box referenced by numeral 582, change "(ISPP)" to --(ISPPs)--

Replace FIG. 13 with the following amended figure:

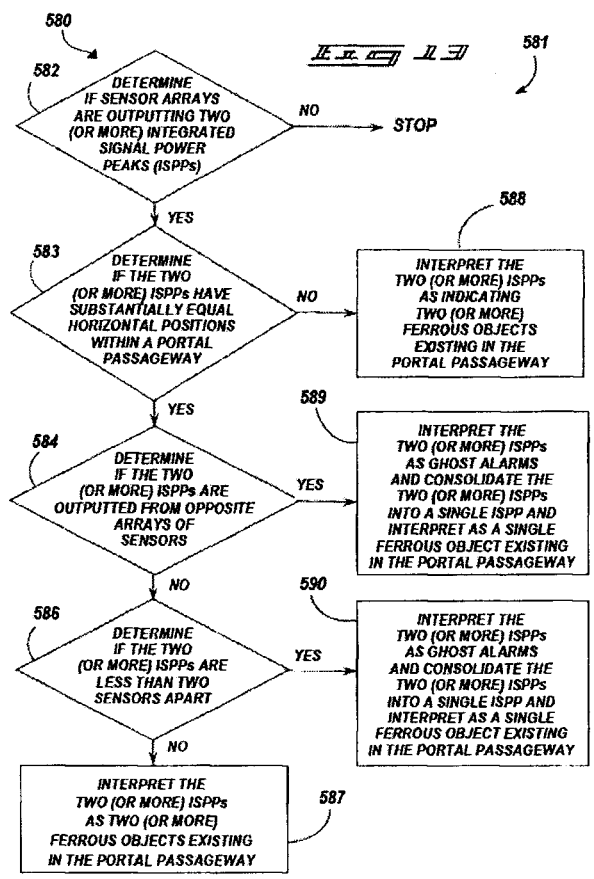

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 7,652,572 B2

In the specification:

| | | |
|---|---|---|
| COLUMN 6, | LINE 22, | change "magnitude" to --of magnitude-- |
| COLUMN 8, | LINE 8, | change "environment" to --environmental-- |
| COLUMN 8, | LINE 9, | change "previously is," to --previously are,-- |
| COLUMN 9, | LINE 51, | change "an ferrous" to --a ferrous-- |
| COLUMN 9, | LINE 60, | change "positive relative" to --position relative-- |
| COLUMN 9, | LINE 61, | change "the ground" to --to the ground-- |
| COLUMN 12, | LINE 21, | change "+$P_r w^2$ where:" to --+$P_r w^2$, where:-- |
| COLUMN 12, | LINE 33, | change "to right" to --to the right-- |
| COLUMN 12, | LINE 44, | change "or left column" to --or column-- |
| COLUMN 13, | LINE 8, | change "*$L^2$+ss$^2$P$_l$," to --*$L^2$+ss$^2$*P$_l$,-- |
| COLUMN 14, | LINE 15, | change "(ISPP)." to --(ISPPs).-- |

In the claims:

CLAIM 4, COLUMN 16, LINE 61, change "value than" to --value greater than--

CLAIM 6, COLUMN 16, LINES 66, 67 after --comprising:-- insert line break and start a new indented paragraph beginning with --determining--

CLAIM 16, COLUMN 17, LINE 51 change "the area" to --an area--